Aug. 1, 1967 E. LEGLER 3,334,182

TELEVISION AFC CIRCUIT

Filed March 24, 1964 2 Sheets-Sheet 1

Inventor:
Ernst Legler by MICHAEL S. STRIKER
Attorney

Aug. 1, 1967 E. LEGLER 3,334,182

TELEVISION AFC CIRCUIT

Filed March 24, 1964 2 Sheets-Sheet 2

Inventor:
Ernst Legler
by MICHAEL S. STRIKER
Attorney 3,334,182
Patented Aug. 1, 1967

3,334,182

TELEVISION AFC CIRCUIT

Ernst Legler, Darmstadt, Germany, assignor to Fernseh G.m.b.H., Darmstadt, Germany Filed Mar. 24, 1964, Ser. No. 354,221
Claims priority, application Germany, Mar 28, 1963, F 39,346
9 Claims. (Cl. 178—69.5)

This present invention relates to a method and apparatus for synchronizing flywheel circuits.

Flywheel circuits generally consist of a phase discriminator, of a filter and an oscillator generating flywheel pulses. In this phase discriminator the repetition frequencies and phases of sync pulses and of the flywheel pulses are compared and a control voltage is derived, controlling the oscillator and maintaining the sync pulses and the flywheel pulses in synchronism.

Thus a control voltage depending upon the phase difference between the sync pulses and the flywheel pulses is derived in the phase discriminator. The rate of change of this control voltage with respect to the change of said phase difference is designated by S'. The rate of change of the repetition frequency of the flywheel pulses with repect to the change of the control voltage is designated by S''. The rate of change of the repetition frequency of the flywheel pulses generated by the oscillator with respect to the change of the phase difference between the sync pulses and the flywheel pulses is designated by S. This rate S is equal to the product of the rate S' and the rate S''.

If the repetition frequency or the phase of the sync pulses is changed, the repetition frequency and the phase of the pulses generated by the oscillator is controlled during a certain period of time. This period depends upon the effective time constant of the flywheel circuit. The effective flywheel time constant is the period necessary until a suddenly occurring change of the phase of the sync pulses decreases to the value of $1/e=0.368$ ($e$ is the base of the natural logarithm).

In flywheel circuits of that kind the term lock in range (interception range) is of importance. This term designates that frequency range, within which a change from the nonsynchronized state to the synchronized state is possible, when the synchronizing frequency deviates from the natural frequency of the oscillator. Occurring interferences are more and more reduced as the time constant of a flywheel circuit is increased. When this flywheel time constant is increased the lock in range decreases, but by known means an automatic change of the time constant may be effected from a small value in the nonsynchronized state to a large value in the synchronized state. Thus it is possible to have a large lock in range, even when the flywheel time constant has a large value.

A good flywheel circuit should respond to sudden changes of the phase or frequency of the sync pulses with an aperiodic transition from the previous state to the new state. From the theory about these flywheel circuits it follows that this is only the case if the product of the flywheel time constant and the rate S has an exactly defined value, which is in turn dependent upon the kind of filter used in the flywheel circuit.

The larger the flywheel time constant should be, the smaller has to be the rate S of the flywheel circuit (with regard to the aperiodic function). It follows however, that a deviation of the synchronizing frequency from the oscillator frequency and a resultant change of this oscillator frequency effects a relatively large phase shift (the maximum value is a full period, that is 360 degrees) between the sync pulses and the oscillator pulses.

In most of the embodiments of flywheel circuits, for example in the field of television technics, only very small phase shifts between the sync pulses and the oscillator pulses are permissible, whereby the reduction of the rate S for the purpose of increasing the flywheel time constant is limited.

In a known circuit arrangement for the synchronization of an oscillator the sync pulses and the oscillator pulses are applied to a phase comparator, and the repetition frequency of the oscillator pulses is controlled by a control voltage. This control voltage is furthermore applied to a phase shifter, which effects a phase shift of the sync pulses or of the oscillator pulses. Thus the phase difference between the sync pulses and the oscillator pulses is reduced. This known circuit arrangement fails to work satisfactorily, when it has to meet especially high requirements regarding the phase synchronism of the sync pulses and the oscillator pulses.

It is a broad object of the present invention to provide a new synchronization system wherein the synchronism of two pulse trains is assured with greater phase accuracy and less interference than it would be possible in known methods and circuit arrangements.

It is a further object of the present invention to provide a novel synchronization system wherein a flywheel circuit may be operated with a very small rate S and a very high phase accuracy and a very large flywheel time constant. The term phase accuracy refers in this case to the deviation of the phase of the flywheel pulses with respect to the mean phase of the sync pulses.

It is still a further object of the present invention to provide a novel apparatus controlling video signals as it is required in the field of television technics.

It is another object of the present invention to provide a novel apparatus for the stabilization of the phase relation of video output signals of tape recorders (jitter compensation).

According to the present invention the sync pulses are applied to a flywheel circuit having a small rate S and an effective flywheel time constant being at least thirty times greater than the period of the sync pulses. In a first phase discriminator of this flywheel circuit the repetition frequencies and the phases of the sync pulses and the flywheel pulses are compared and a first control voltage is derived, controlling the repetition frequency of the flywheel pulses whereby a relatively large phase difference between the sync pulses and the flywheel pulses is maintained. By means of a controllable phase shifter this large phase difference between the sync pulses and the flywheel pulses is reduced. Thus phase-corrected flywheel pulses are obtained. The sync pulses and the phase-corrected flywheel pulses are applied to a second phase discriminator and by a comparison of the phases a second control voltage is derived, by means of which said phase shifter is controlled.

In a preferred embodiment of the invention the effective flywheel time constant is eighty to one-hundred times greater than the period of the sync pulses. It is furthermore advisable to apply a flywheel circuit with such a small rate S, that between the sync pulses and the flywheel pulses a phase difference of at least 50 degrees to a maximum of 360 degrees is necessary for effecting a change of the control voltage from its minimum value to its maximum value.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

In all these drawings corresponding elements are designated by the same reference symbols.

Figure 1:
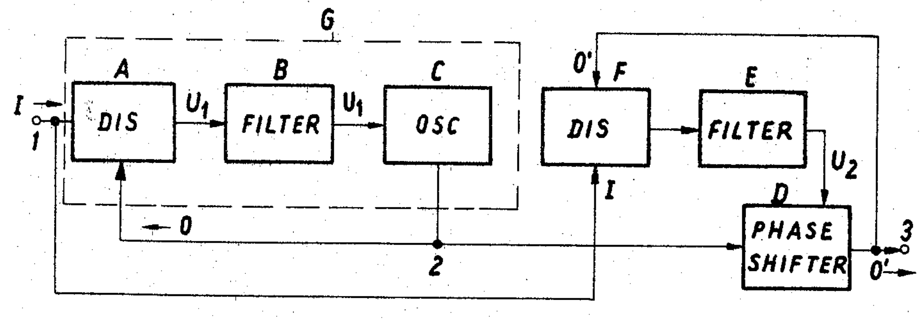
FIG. 1 is a schematic representation of an embodiment of the invention.

According to FIG. 1 the first phase discriminator A, the filter B and the oscillator C form a flywheel circuit G. In the phase discriminator A sync pulses I (applied by way of terminal 1) are compared with the flywheel pulses O (generated in the oscillator C) in frequency and phase. A first control voltage $U_1$ obtained thereby is applied by way of the filter B (low-pass filter with low cutoff-frequency) to the oscillator C, being controlled in such a manner, that pulse frequencies of the flywheel pulses C and the sync pulses I are maintained in synchronism.

The flywheel time constant of the flywheel circuit G is, however, determined by the cutoff frequency of the filter B. This flywheel circuit G has a relatively small rate S that is, a deviation of the synchronizing frequency I from the natural frequency of the oscillator C results in a relatively large phase difference (up to 360 degrees) between the sync pulses I and the flywheel pulses O.

The flywheel circuit G is followed by a circuit, comprising the phase discriminator F having a large rate S′ the low-pass filter E and the electronic phase shifter D. The flywheel pulses O are thus passed through the phase shifter D, from the output of which phase-corrected flywheel pulses O′ are supplied to terminal 3 (output of the circuit arrangement). For carrying out this phase correction these flywheel pulses O′ are compared with the sync pulses I by means of the phase discriminator F. The thus obtained second control voltage $U_2$ is applied by way of the low-pass filter E to the phase shifter D which reduces the phase differences between the sync pulse I and the flywheel pulses O′.

Figure 2:
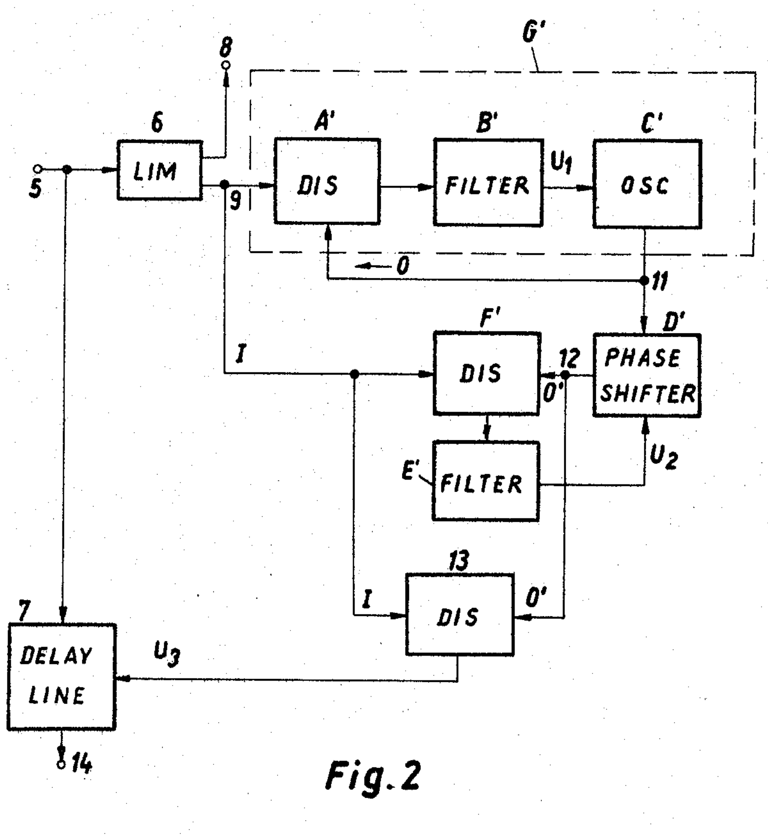
FIGURE 2 is a block circuit diagram of a circuit arrangement for the stabilization of the horizontal phase of a video signal.

The circuit arrangement according to FIG. 2 serves to stabilize the phase relation of the output signal (video signal) of a tape recorder (jitter compensation). Such a video signal (a composite video signal consisting of picture signal components, of blanking signal components and of sync signal components) is applied by way of terminal 5 to the limiter 6 on the one hand and to the electronically controlled delay line 7 on the other hand. The phase relation of this video signal and particularly the phase relation of the line sync pulses of this video signal is subject to variations, caused by the tape recorder.

In the limiter 6 (limiting the amplitude) the sync signal components are separated from the composite video signal, and by way of the circuit point 8 vertical sync pulses and by way of the circuit point 9 horizontal sync pulses I are supplied. The phase discriminator A′ (a phase discriminator with a small rate S′) and the horizontal frequency oscillator C′ form a flywheel circuit G′, of which the effective flywheel time constant is $4.2 \cdot 10^{-3}$ sec. (relatively large) and which has a small rate S. To this flywheel circuit G′ there are applied by way of circuit point 9 the sync pulses I, and by way of the circuit point 11 there are supplied horizontal frequency flywheel pulses O.

In the phase discriminator F′ (which has a large rate S′) the sync pulses I are compared in phase with the flywheel pulses O′, and the thus obtained second control voltage $U_2$ is applied by way of the filter E′ (which has a very low cutoff frequency) to the phase shifter D′. Thus horizontal frequency flywheel pulses O′ are available at the circuit point 12; the space between these pulses is constant to a great extent (phase accuracy 0.3 degrees per 1 percent frequency variation of the sync pulses I), whereas the spaces between the horizontal sync pulses I transmitted by way of the circuit point 9 are subject to variations. In order to achieve the same phase accuracy of the pulses O′ by means of a flywheel circuit without an additional circuit (D′, E′, F′) for phase correction, it would be necessary to reduce the effective flywheel time constant (of G′) to approximately $1.5 \cdot 10^{-4}$ sec. (that is by the factor 30), in order to satisfy the condition of aperiodic transition. In this case, however the safety against interference would be reduced to the same extent.

The sync pulses I and the phase-corrected flywheel pulses O′ are compared in phase in the phase discriminator 13 and a third control voltage $U_3$ is derived, which represents a measure for the phase variations of the initially applied video signal (via point 5). This phase discriminator 13 has a large rate S′ and a large control velocity.

The control voltage $U_3$ is applied to the delay line 7. This delay line is controlled such that the phase differences of the video signal applied by way of terminal 5 are compensated to a great extent. When by way of example the space between two succeeding horizontal sync pulses (compared with a desired value) is too great, the video signal is delayed by the delay line 7 such that a phase-stabilized video signal may be taken off.

Figure 3:
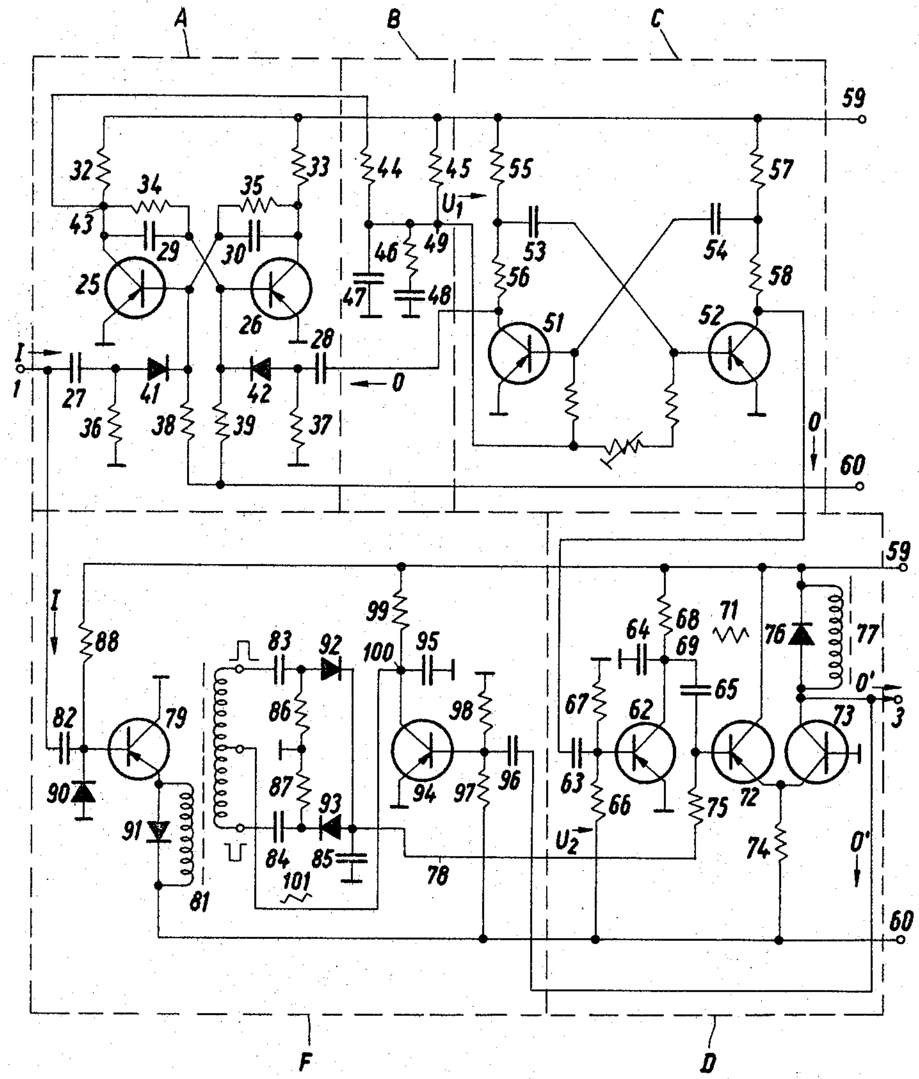
FIG. 3 is a representation of a circuit arrangement in detail according to FIG. 1.

According to FIG. 3 the sync pulses I are applied by way of terminal 1 to the phase discriminator A (a bistable vibrator) comprising two transistors 25, 26 (type SET 229), the condensers 27, 28 (100 μf.), 29, 30 (each 150 pf.), the resistors 32, 33 (each 1.8K ohm), 34, 35 (each 5.6K ohm), 36, 37 (each 10K ohm), 38, 39 (each 390K ohm) and two diodes 41, 42 (type OA 72). This bistable vibrator is brought to one of its stable states respectively by the leading edges of the sync pulses I and is returned its second stable state by the oscillator pulses O applied by way of the condenser 28. From the circuit point 43 there are derivable rectangular pulses, of which the pulse duration corresponds exactly to the momentary phase difference between the sync pulses I on the one hand and the flywheel pulses O on the other hand.

This sequence of rectangular pulses is applied to the filter B comprising the resistors 44 (15 ohm), 45 (4.7 ohm), 46 (270 ohm) and the condensers 47 (6 μf.), 48 (44 μf.). A first control voltage $U_1$ thus obtained, is applied by way of the circuit point 49 to the oscillator C. The oscillator C is arranged as a stable vibrator and consists of the transistors 51, 52 (type OC 468), of the condensers 53, 54 (each 4.7 nf.) and of the resistors 55 to 58 (each 470 ohm). The circuit points 59 and 60 respectively are connected to the negative terminal (—9 v.) and the positive terminal (+6.5 v.) respectively of a direct voltage source.

The flywheel pulses O are derived from the collector of the transistor 52 and applied to the phase shifter D. This phase shifter comprises the sawtooth generator with the transistor 62 (type SFB 229), the condensers 63 (100 pf.), 64 (10 nf), 65 (50 μf) and the resistors 66 (100 K ohm), 67 (10 K ohm), 68 (22 K ohm). In the circuit point 69 there arises the sawtooth voltage 71 having the same repetition frequency and being in phase with the flywheel pulses O. The limiter associated to the phase shifter D consists of the transistors 72, 73 (type SFB 229), of the resistors 74 (1.5 K ohm), 75 (22 K ohm), of the diode 76 and the coil 77. By way of the circuit point 3 there is then derivable a train of phase-corrected flywheel pulses O′. This phase correction is effected in that the D.C. component of the sawtooth signal 71 is varied in relation with a control voltage $U_2$ applied by way of the lead 78, and the signal 71 is clipped at a constant limiting potential.

The sync pulses I applied by way of terminal 1 and the flywheel pulses O′ supplied by way of the output 3 are applied to the phase discriminator F, obtaining that second control voltage $U_2$, which is applied by way of lead 78 to the phase shifter D. This second phase discriminator F consists of a phase detector and of a sawtooth generator. The phase detector comprises in manner known per se the transistor 79 (type OC 141), the transformer 81, the condensers 82 (200 pf.), 83, 84, 85 (each 0.1 μf.), the resistors 86, 87 (each 22K ohm), 88 (10K ohm) and the diodes 90 to 93 (type OA 72. The sawtooth generator consists of the transistor 94 (type SFD 229), of the condensers 95 (10 nf.), 96 (100 pf.) and of the resistors 97 (100K ohm), 98 (10K ohm), 99 (22K ohm). The train of oscillator pulses O′ derived from the collector of the transistor 73 is thus applied by way of the condenser 96 to the sawtooth generator, so that there arises in the circuit point 100 the sawtooth voltage 101. This sawtooth voltage 101 has the same repetition frequency and phase relation as the flywheel pulses O′ and is compared in phase with the sync pulses I obtaining the mentioned control voltage $U_2$.

The rate S (of the flywheel circuits G and G′ and G″ respectively) is equal the product of the rate S′ (of the corresponding phase discriminator A and A′ and A″ respectively) by the rate S″ (of the oscillators C and C′ and C″ eventually with the reactance stage respectively). The rate S″ has to be considered as given value for a certain oscillator circuit. In order to effect a frequency change of "p" percent by means of the oscillators (multivibrators, blocking oscillators) working as switches, a change of the control voltage by approximately 1.4 "p" percent with reference to the operating voltage commutated by the oscillator is necessary. If by way of example the oscillator frequency is 10,000 c.p.s. and there is given an operating voltage of 10 v. and frequency changes of $0.03 \cdot 10{,}000$ c.p.s. (equal to 300 c.p.s.) occur, a change of the control voltage of $1.4 \cdot 0.03 \cdot 10 = 0.42$ v. is necessary to diminish this frequency change. The amount of the rate S is therefore mainly determined by the choice of the rate S′.

If a certain frequency range is given, within which the flywheel circuit is to synchronize, the required control voltage (the necessary control voltage change $\pm\Delta U_1$) may be given by means of the rate S″. The phase difference between the sync pulses I and the flywheel pulses O, which is required in the phase discriminator, in order to produce this control voltage change $\pm\Delta U_1$, is determined by the rate S′. If a phase difference (between the sync pulses I and flywheel pulses O) of 360 degrees is necessary, in order to effect a change of the control voltage from its minimum value to its maximum value, the rate S′ has its minimum value.

A small rate S′ signifies an approximation to this minimum value. A small rate S′ is given, when a phase difference (between the sync pulses I and the flywheel pulses O) of at least 50 degrees to a maximum of 360 degrees is necessary for changing the control voltage from its minimum value to its maximum value. If on the contrary, a phase difference (between the sync pulses I and the flywheel pulses O) of only 4 degrees or less is required for changing the control voltage from its minimum value to its maximum value, then a large rate S′ is necessary.

While the invention has been illustrated and described as embodied in an arrangement for synchronizing flywheel circuits it is not intended to be limited to the details shown, since various modifications and structural changes may be made without departing in any way from the spirit of the present invention.

What is claimed as new and desired to be secured by Letters Patent is:

1. Apparatus for synchronizing a train of sync pulses and a train of flywheel pulses comprising, in combination, a first phase discriminator having a first and a second input lead and one output lead, delivering via said output lead a first control voltage depending upon the phase difference of signals applied to said first and second input lead respectively; a first filter; an oscillator having one input lead and one output lead, generating said flywheel pulses and being controllable by a control voltage applied to its input lead; connection means connecting said output lead of said first phase discriminator via said first filter to said input lead of said oscillator; connection means applying said sync pulses to said first input lead of said first phase discriminator; connection means connecting said output lead of said oscillator to said second input lead of said first phase discriminator; a flywheel circuit consisting of said phase discriminator, of said first filter and of said oscillator; a second phase discriminator having a first and a second input lead and one output lead and delivering via said output lead a second control voltage depending upon the phase difference of input signals applied to its first and second input lead respectively; a second filter; a phase shifter having a first and a second input lead and one output lead and shifting the phase of a signal applied to its first input lead in dependence upon a control voltage applied to its second input lead; connection means connecting the output lead of said oscillator to said first input lead of said phase shifter; connection means applying said sync pulses to said first input lead of said second phase discriminator; connection means applying phase corrected flywheel pulses of said phase shifter to said second input lead of said second phase discriminator; connection means connecting the output lead of said second phase discriminator via said second filter to said second input lead of said phase shifter; and connection means applying said phase corrected flywheel pulses to the output of said apparatus.

2. Apparatus according to claim 1, comprising said flywheel circuit effecting a first rate of change of the repetition frequency of said flywheel pulses with respect to the change of the phase difference between said sync pulses and said flywheel pulses, and being adapted that its effective flywheel time constant is at least thirty times larger than the periods of said sync pulses; and further comprising said second phase discriminator being adapted to effect a second rate of change of said second control voltage with respect to the change of said phase difference between said input signals, said second rate being larger preferably by a multiple than said first rate of said flywheel circuit.

3. Apparatus for synchronizing a train of horizontal sync pulses and a train of flywheel pulses according to claim comprising, in combination, a generator generating a composite video signal being composed of picture signal components, blanking signal components and sync signal components; a limiter clipping said sync signal component; a separator stage having one input lead and a first and second output lead and separating said horizontal sync pulses and vertical sync pulses of said sync signal components; a horizontal frequency oscillator generating said flywheel pulses; connection means applying said composite video signal to said limiter; connection means applying said sync signal components from the output lead of said limiter to said input lead of said separator stage; connection means applying the horizontal sync pulses via said first output lead of said separator stage to said first input lead of said first phase discriminator; connection means connecting said output lead of said first phase discriminator via said first filter to the input lead of said horizontal frequency oscillator; a delay line shifting the phase of said composite video signal applied to its input lead in dependence upon a third control voltage applied to its second input lead; a third phase discriminator having a first and a second input lead and one output lead and delivering via said output lead said third control voltage depending upon the phase difference of signals applied to its first and second input lead respectively; connection means connecting said first output lead of said separator stage to the first input leads of said second and third phase discriminator; connection means connecting the output lead of said phase shifter to said second input lead of said third phase discriminator; and connection means applying a phase shifted composite video signal via the output leads of said delay line to said output of said apparatus.

4. Apparatus according to claim 1 comprising a sawtooth generator generating sawtooth pulses having the same repetition frequency and phase relation as said flywheel pulses; connection means applying said sawtooth pulses to said first input lead of said phase shifter, said phase shifter altering the direct current component of said sawtooth pulses in dependence upon the value of said second control voltage and clipping said sawtooth pulses at a constant clipping level and thus obtaining said phase corrected flywheel pulses.

5. First phase discriminator according to claim 1 comprising a bistable vibrator being synchronized by said sync pulses on the one hand and by said flywheel pulses on the other hand whereby each said sync pulse switches said vibrator from one of its stable stages to its other state and each of said flywheel pulses effects its initial state, said vibrator generating a train of rectangular pulses having pulse widths depending upon the phase difference of said sync pulses and said flywheel pulses; and means deriving from said train of rectangular pulses said first control voltage.

6. Second phase discriminator according to claim 1 requiring a phase difference between said sync pulses and said flywheel pulses of not greater than four degrees in order to effect a change of said second control voltage from its minimum value to its maximum value.

7. Flywheel circuit according to claim 1 requiring a phase difference of at least fifty degrees to a maximum of three hundred and sixty degrees in order to effect a change of said first control voltage from its minimum value to its maximum value.

8. Method for synchronizing a train of sync pulses and a train of flywheel pulses comprising the steps of generating said flywheel pulses by means of a flywheel circuit effecting a first rate of change of the repetition frequency of said flywheel pulses with respect to the change of the phase difference between said sync pulses and said flywheel pulses, said flywheel circuit being adapted that its effective flywheel time constant is at least thirty times larger than the periods of said sync pulses; comparing phases of said flywheel pulses and said sync pulses and delivering a first control voltage; controlling the repetition frequency of said flywheel pulses by means of said first control voltage; shifting the phase of said flywheel pulses and delivering phase-corrected flywheel pulses in dependence upon a second control voltage applied to it; comparing the phases of said flywheel pulses and of said phase corrected flywheel pulses by means of a second phase discriminator, said second phase discriminator being adapted to effect a second rate of change of said second control voltage with respect to the change of said phase difference between said flywheel pulses and said phase corrected flywheel pulses, said second rate being larger than said first rate of said flywheel circuit.

9. Method according to claim 8 comprising the steps of generating a composite video signal being composed of picture signal components, blanking signal components and sync signal components; separating said sync signal components from said picture signal components and said blanking signal components; further separating the horizontal sync pulses from the vertical sync pulses of said sync signal components; generating horizontal frequency flywheel pulses; comparing the phases of said horizontal sync pulses and said horizontal frequency flywheel pulses and delivering said first control voltage; controlling the frequency of said horizontal frequency flywheel pulses by means of said first control voltage; shifting the phase of said composite video signal in dependence upon a third control voltage; comparing the phases of said horizontal sync pulses and said phase corrected flywheel pulses and delivering said third control voltage to said delay line.

References Cited

UNITED STATES PATENTS

| | | | |
|---|---|---|---|
| 3,112,364 | 11/1963 | Myles | 178—69.5 |
| 3,182,128 | 5/1965 | Legler | 178—69.5 |

JOHN W. CALDWELL, *Acting Primary Examiner.*

R. L. RICHARDSON, *Assistant Examiner.*